United States Patent
Akella et al.

(10) Patent No.: US 7,535,898 B2
(45) Date of Patent: May 19, 2009

(54) DISTRIBUTED SWITCH MEMORY ARCHITECTURE

(75) Inventors: Visveswar Akella, Fremont, CA (US); Sanjay Sharma, Fremont, CA (US); Amalkiran Bommireddy, Fremont, CA (US); Dinesh Venkatachalam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 11/315,565

(22) Filed: Dec. 22, 2005

(65) Prior Publication Data

US 2007/0297437 A1  Dec. 27, 2007

Related U.S. Application Data

(63) Continuation of application No. 10/704,510, filed on Nov. 6, 2003, now Pat. No. 6,993,020.

(51) Int. Cl.
*H04L 12/28* (2006.01)

(52) U.S. Cl. .................... 370/378; 370/386; 370/401

(58) Field of Classification Search ................ 370/378, 370/386, 401
See application file for complete search history.

(56) References Cited

U.S. PATENT DOCUMENTS

| | | | | |
|---|---|---|---|---|
| 5,570,348 A | * | 10/1996 | Holden | 370/236 |
| 6,233,242 B1 | * | 5/2001 | Mayer et al. | 370/412 |
| 6,246,683 B1 | * | 6/2001 | Connery et al. | 370/392 |
| 6,430,184 B1 | * | 8/2002 | Robins et al. | 370/392 |
| 6,876,654 B1 | * | 4/2005 | Hegde | 370/392 |

* cited by examiner

*Primary Examiner*—Edan Orgad
*Assistant Examiner*—Jay P Patel
(74) *Attorney, Agent, or Firm*—Kacvinski LLC

(57) ABSTRACT

A distributed memory switch system for transmitting packets from source ports to destination ports, comprising: a plurality of ports including a source port and a destination port wherein a packet is transmitted from the source port to the destination port; a memory pool; and an interconnection stage coupled between the plurality of ports and the memory pool such that the interconnection stage permits a packet to be transmitted from the source port to the destination port via the memory pool.

14 Claims, 12 Drawing Sheets

DISTRIBUTED SWITCH MEMORY ARCHITECTURE

This application is a continuation of U.S. patent application Ser. No. 10/704,510 filed on Nov. 6, 2003 which issued as U.S. Pat. No. 6,993,020 on Jan. 31, 2006.

BACKGROUND OF THE INVENTION

1. Field of the Invention

This invention relates generally to the field of network switching and more specifically to a switch architecture capable of transmitting packets between ports in which a switch memory for temporarily storing packets while forwarding decisions are made is configured as a pool that is available to all ports in the switch.

2. Description of the Related Art

Network switches provide a solution to client congestion problems by switching network traffic at high speeds between ports, rather than having every user broadcast to every other user in the network. Network switches enable information (formatted into packets) to be switched from one port to another port based upon the Ethernet addresses embedded in the packets. Conventional network switches are formed with switch-nodes that are interconnected to each other. Each switch-node typically has a physical link to an interconnection matrix which switches data between different switch-nodes. The interconnection matrix between switch-nodes typically incorporate either a cross-bar or a shared-bus architecture. The cross-bar and shared-bus architectures permit the forwarding of packets from a switch-node to another switch-node once packet switching decisions are made. The packet switching decisions are performed by processing hardware incorporated within each switch-node. Additionally, a local static random access memory (SRAM) for temporarily storing ingress and egress packets is incorporated within each of the conventional switch nodes.

Referring first to FIG. 1, there is seen a conventional switch system 100 which is based on the cross bar architecture and which includes switch-nodes 105, 110, 115 and 120. Switch-node 105 includes a local SRAM 105a that is configured for storing ingress and egress packets and is organized according to a First-In/First-Out (FIFO) discipline in order to prevent inversions in the packet order. A controller 105b controls the FIFO queue of packets which are temporarily stored in the local SRAM 105a. The processing logic 105c performs switching decisions on the packets. A plurality of ports 105d receive and transmit the ingress and egress packets, respectively. Switch-node 105 is further coupled to the cross-bar switch 125 for permitting packets to be transmitted to other switch-nodes once switching decisions are made by the processing logic 105c. Similarly, each of the other switch-nodes (e.g., nodes 110, 115, or 120) includes a local SRAM, controller, processing logic, and ports, and are likewise coupled to the cross-bar switch 125. The cross-bar switch 125 is based on a meshed interconnection matrix design and permits a packet from any port on a switch-node to be forwarded to a port of any other switch-node once switching decisions are made for the packet.

Packets that must be switched between switch-nodes are required to travel via the cross-bar switch 125. A packet destined for a busy port in another switch-node can thus block other packets destined for other non-busy ports, thereby resulting in a "head-of-line" blocking problem. For example, assume the packets 130 and 135 both originate from node 115 whereby packet 130 is destined for node 110 while packet 135 is destined for node 120. Assume further that packet 130 is ahead of packet 135 in the FIFO queue of SRAM 115a of node 115. In this example, the destination port of packet 130 in node 110 is busy and is unable to accept incoming packets, while the destination port of packet 135 in node 120 is not busy. Thus, packet 130 is required to wait until the destination port in node 110 is available to receive data. Transmission of packet 135 is also blocked until packet 130 is transmitted, even though the destination port of packet 135 is ready. Thus, the head-of-line blocking problem can lead to undesirable performance such as packet transmission delay.

FIG. 2 illustrates a switch system 150 which incorporates the shared-bus architecture and which includes switch-nodes 160, 165, 170, and 175. A shared-bus 185 connects switch-nodes 160, 165, 170, and 175 together and is local to a PCB card. Each of the switch-nodes 160-175 includes elements performing similar functions as those in switch-nodes 105-120 of FIG. 1. For example, switch-node 160 includes a local SRAM 160a, FIFO controller 160b, processing logic 160c, ports 160d and connections to shared-bus 185 for permitting packets to be transmitted to other switch-nodes once switching decisions are made by the processing logic 160c. Similarly, the other switch-nodes (e.g., nodes 165, 170, or 175) each include a local SRAM, controller, processing logic, ports and connections coupled to the shared bus 185. The switch-nodes 160-175 follow a standard arbitration scheme (e.g., time division multiplexing, round-robin arbitration, etc.) so that a switch-node can access the shared bus 185 and transmit a packet via the shared-bus 185 to another switch-node.

A disadvantage of the shared-bus design in FIG. 2 is as follows. By adding switch-nodes to the shared-bus 185, the load of the shared-bus is increased. An increased load limits the frequency of operation of the network switch 150, thereby limiting switching capacity. Additionally, due to the shared configuration of the bus 185, blocking effects may occur in the shared-bus switch system 150 of FIG. 2. One example of such blocking effects is the head-of-line blocking problem which was discussed above.

The cross-bar switch system 100 (FIG. 1) and the shared-bus switch system 150 (FIG. 2) also have the following disadvantages. As stated above, switch-nodes 105-120 (FIG. 1) and switch-nodes 160-175 (FIG. 2) each include, respectively, a local SRAM for storing ingress and egress packets before packets are transmitted to other switch-nodes. However, SRAM devices are expensive (as compared to dynamic random access memory (DRAM) devices). In the conventional switch systems 100 and 150 (FIG. 1 and FIG. 2, respectively), SRAM devices of sufficient sizes can be implemented, but this option leads to higher cost.

Alternatively, the sizes of the SRAM devices can be made smaller to reduce cost, but decreasing the memory sizes will limit the bandwidth capacity of the switch system. A limited bandwidth capacity leads to a limited switching capability. Additionally, the conventional switch systems 100 and 150 require additional hardware to implement the switch-nodes in the network, thereby resulting in additional implementation costs.

One conventional approach is to use chassis-based designs to implement the switch-nodes and the switch systems. However, chassis-based designs also increase the overall cost of switch systems. In addition, chassis-based designs have poorer integration characteristics, since these designs require a given amount of logic to be implemented in multiple cards. Additional logic is then needed to serve as an interface between the multiple cards.

Accordingly, there is a need for a switch memory architecture which overcomes the above-mentioned deficiencies of conventional switch systems and which is less expensive to implement. The present invention fulfills this need, among others.

SUMMARY OF THE INVENTION

An object of the invention is to prevent the occurrence of the head-of-line blocking problem of the prior art.

Another object of the invention is to provide a switch system that is less expensive than conventional systems and that has a higher bandwidth and switching capability than conventional systems.

Another object of the invention is to provide a switch system that can easily incorporate advances in DRAM technology (e.g., higher speed, higher bandwidth or higher capacity).

Another object of the invention is to provide a switch system which permits memory to be dynamically allocated between switch ports.

Another object of the invention is to provide a switch system capable of higher integration and lower implementation costs as compared to conventional systems.

Another object of the invention is to provide a switching logic which can be implemented with smaller PCBs, which lead to small form factor systems.

Another object of the invention is to provide a switch system capable of permitting the achievement of wire speed switching for packets of any size between 64 bytes to about 1518 bytes, and up to about 9 kbytes for jumbo packets.

Another object of the invention is to provide a switch system which can be easily scaled by number of ports and/or amount of memory without limiting the system's switching capacity.

The present invention fulfills these objects, among others. According to one aspect, an apparatus according to the invention broadly provides a distributed memory switch system for transmitting packets from source ports to destination ports, comprising a plurality of ports including a source port and a destination port wherein a packet is transmitted from the source port to the destination port; a memory pool; and an interconnection stage coupled between the plurality of ports and the memory pool such that the interconnection stage permits a packet to be transmitted from the source port to the destination port via the memory pool.

In the immediate foregoing distributed memory switch system, the interconnection stage comprises a switch stage connected to the plurality of ports and a memory switch connected to the switch stage and to the memory pool. The switch stage and the memory switch can be implemented by one or more ASICs.

The present invention further provides a switch system for switching packets between ports, comprising an interconnection stage configured to transmit packets between ports; and a memory pool coupled to the interconnection stage for storing packets which are received from the ports.

According to another aspect of the invention, the present invention broadly provides a method for transmitting packets from source ports to destination ports, comprising the steps of: detecting the arrival of a packet from a source port; determining the address locations in a memory pool for buffering the packet after the packet is received from the source port of the packet; buffering the packet in the memory pool after the packet is received from the source port; retrieving the packet in the memory pool; and transmitting the packet from the memory pool to the destination port of the packet.

The list of objects and possible advantages and benefits above is not necessarily exhaustive and further advantages and benefits will become apparent upon studying the detailed description of the invention provided hereinbelow.

DETAILED DESCRIPTION OF THE INVENTION

Figure 3:
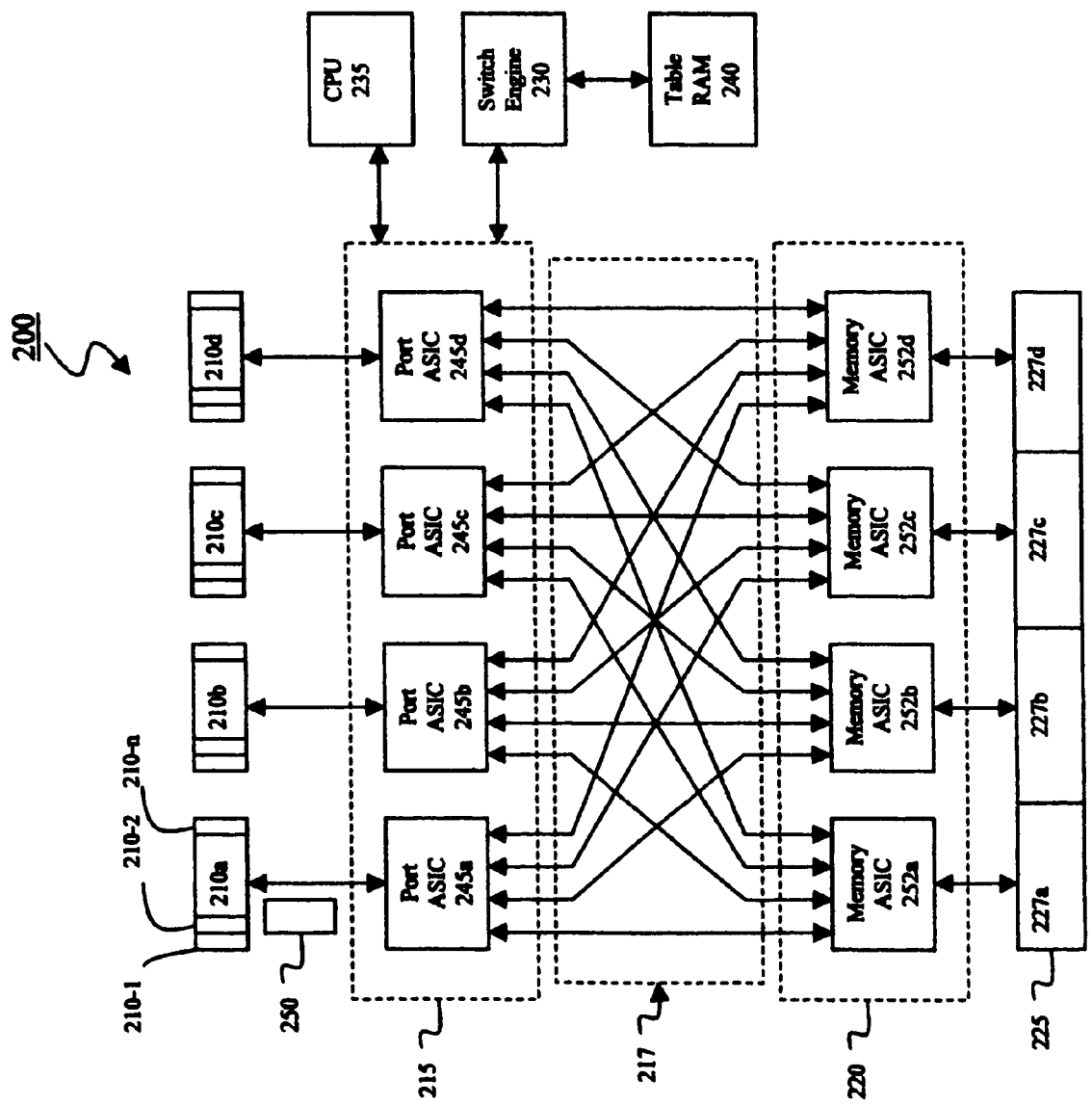
FIG. 3 illustrates a memory switch system according to a first embodiment of the present invention.

Referring in detail now to the drawings wherein similar parts or steps of the present invention are identified by like reference numerals, there is seen in FIG. 3 a schematic block diagram of a memory switch system 200 in accordance with a preferred embodiment of the present invention. The switch system can switch packets between nodes in a local area network (LAN) or different network segments or different networks in a wide area network (WAN).

Switch system 200 is capable of switching packets between a plurality of ports, shown configured as four sets of ports 210*a*-210*d*, with each set having 1 to n ports. The ports 210-1 . . . 210-n can be implemented by port modules such as an 8×10/100 Mb port module (100 Base TX), a 1-Gigabit port module, or a 4-port 100 Base FX module. The ports 210-1 . . . 2210-n can each also include a WAN module such as a module capable of T1/T3/E1/E3 operations in TDM, frame relay, or ATM formats.

A switch stage 215 is comprised of four Port ASICs 245*a-d* and is coupled to a memory switch 220 via an interconnect 217, while a memory pool 225 is coupled to memory switch 220. Each port ASIC 245*a*-245*d* respectively interfaces with ports 210*a*-210*d* and acts to transfer packets between the ports 210-1 . . . 210-n and memory pool 225 via memory switch 220. Accordingly, packet 250 can be transmitted from any one of the ports 210-1 . . . 210-n associated with a Port ASIC, via memory pool 225, to another of the ports 210-1 ... 210-n associated with the same or any of the other Port ASICs. The switch stage 215, interconnect 217 and memory pool 225 can therefore be collectively referred to as an interconnect stage that interconnects the individual ports with the common memory pool 225.

A switch engine 230 and a central processing unit (CPU) 235 communicate with the Port ASICs in switch stage 215 so that a packet 250 can be transmitted from its source node to its destination node, as elaborated upon more fully hereinafter. Table RAM 240 is coupled to switch engine 230 and can be implemented by a conventional RAM which is available from numerous memory suppliers. Switch engine 230 maintains Table RAM 240 so that it lists addresses corresponding to temporarily stored packets 250 as will be described in more detail below.

CPU 235 can be implemented by, for example, the MC 68360 microprocessor from Motorola, Inc. of Schaumberg, Ill. CPU 235 sets up the initial configuration of switch system 200, as elaborated more fully hereinafter. CPU 235 may also gather statistics and other management information from the packet flows, run diagnostics, and report systems errors, as is conventionally known.

Switch engine 230 performs the packet switching determination operations for forwarding packets 250 received from the ports 210-1 ... 210-n. An example of a switch engine which can perform the above operations is described in commonly assigned U.S. patent application Ser. No. 09/058,335, entitled "Method and Apparatus for Multiprotocol Switching and Routing", filed on Apr. 10, 1998, which is fully incorporated herein by reference. An advantage of implementing the invention with the switch engine of the co-pending application is that processor overhead is minimized since decision-making tasks on packet switching are efficiently allocated between the CPU 235, and the dedicated ASICs 230, 245a-245d, and 252a-252d. However, the present invention is not limited to use with the switch engine in the co-pending application; rather, other switch engines may be used.

As described above, switch stage 215 is implemented by four application specific integrated circuit (ASIC) elements which are specifically shown in FIG. 3 as Port ASICs 245a, 245b, 245c, and 245d. Likewise, the Memory Switch 220 can be implemented as four ASICs which are shown as Memory ASICs 252a, 252b, 252c, and 252d. The Port ASICs 245a-245d are coupled to the Memory ASICs 252a-252d to form a 4×4 interconnection stage 217, which can be implemented by, for example, sixteen fast serial connections (i.e. SerGig) connected and arranged as shown in FIG. 3.

Figure 4A:
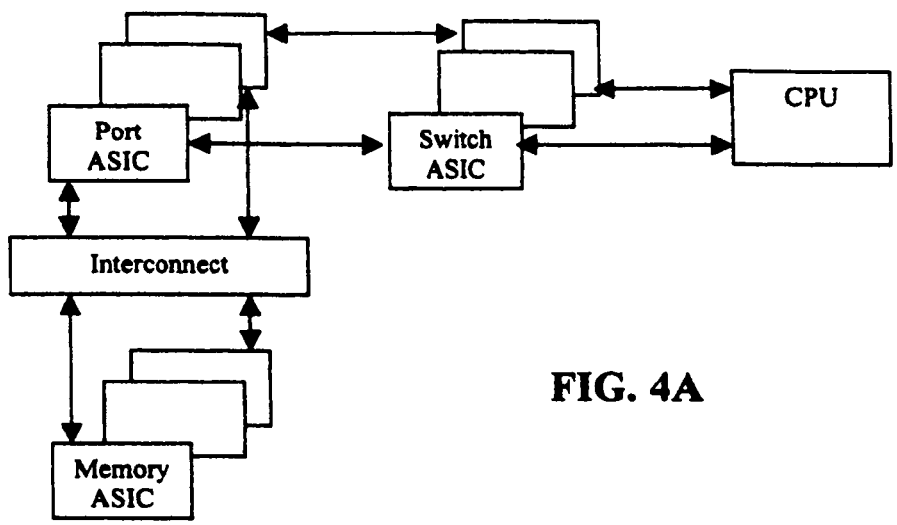
FIGS. 4A to 4C illustrate alternative implementations of the memory switch system consistent with the principles of the present invention.
Figure 4B:
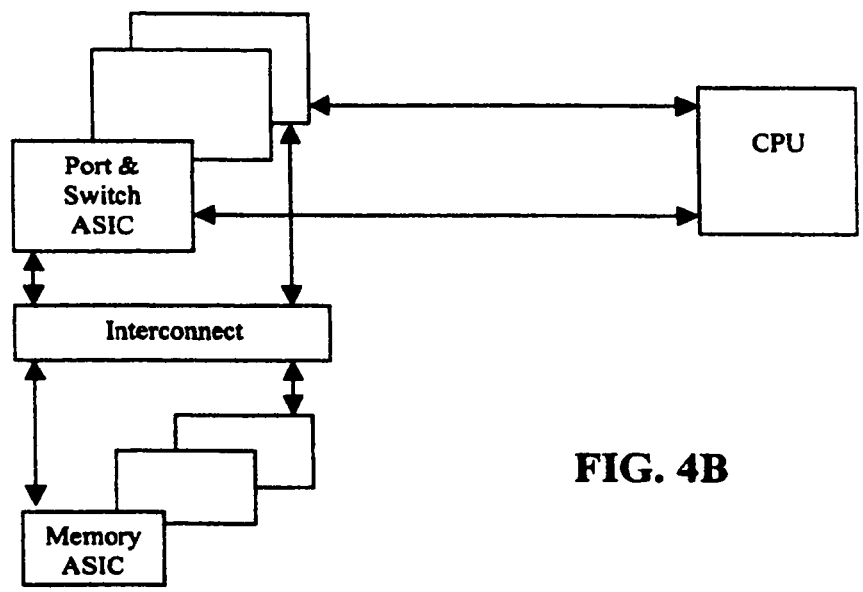
Figure 4C:
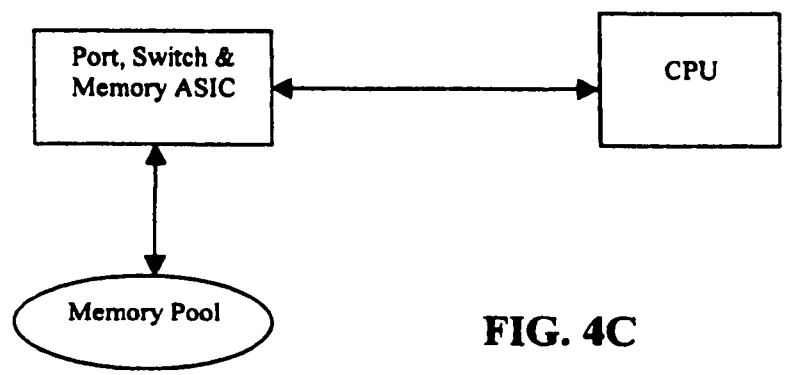

In FIG. 3, the Port ASICs and the Memory ASICs are shown in separate blocks to assist in describing the functionality of the present invention. Based on the teachings of the invention, however, those skilled in the art will realize that many different implementations are possible. For example, as shown in FIG. 4A, each of the separate Port ASICs can communicate with respective switch ASICs having the functionality of switch engine 230. Alternatively, as shown in FIG. 4B, the functionality of the Port ASICs and switch engine can be combined into single respective ASICs that communicate with the CPU and with the Memory ASICs via the interconnection stage. As a further alternative, as shown in FIG. 4C, the functionality of the Port ASICs, switch engine and Memory ASICs can be implemented by a single VLSI device formed on a single semiconductor substrate that directly communicates with the memory pool and the CPU.

As for the implementation shown in FIG. 3, the Port ASICs 245a-245d each concentrate a large number of low-bandwidth data streams received from the multiple ports 210-1 ... 210-n (e.g. n=8, 16, 24, etc.), and convert the low-bandwidth data streams into a low number (e.g. 4, 8, 12, etc.) of high-bandwidth data streams which are received by the Memory ASICs 252a-252d. Accordingly, the Memory ASICs 252a-252d are preferably optimized to switch a smaller number of high-bandwidth data streams. This optimization arises from the feature that a given Memory ASIC has a pin budget which determines the amount of data streams which can be concurrently received by the given Memory ASIC. Additionally, the above optimization arises from the feature that the memory devices 227a-227d (in the memory pool 225) can transfer data at a higher rate than data is communicated via ports 210.

The efficiency achieved by optimizing the Memory ASICs 252a-252d to switch a smaller number of high-bandwidth streams is further noted in the following comparison. A standard 100 Mbit MII (Media Independent Interface) requires twenty (20) pins to transfer 200 Mbits of data. In contrast, in the configuration shown in FIG. 3, sixteen (16) pins of Memory ASICs 252a-252d can each carry 960 Mbits of data, if the interconnect between switch stage 215 and 220 is clocked at 60 MHz.

Memory pool 225 can be formed by a plurality of DRAM type devices 227a, 227b, 227c, and 227d. One example of a DRAM device which can be used to implement devices 227 in memory pool 225 is an 8-Mbit Rambus DRAM, which is available from various memory suppliers. According to a preferred embodiment of the invention, the total bandwidth of the memory pool 225 is set at a value that is at least (or greater than) the sum total of the bandwidths of the ports 210-1 ... 210-n. This permits the full bandwidth at the ports 210-1 ... 210-n to be supported by the memory pool 225 at any given time. Additionally, by setting the memory pool 225 bandwidth at a value which is greater than the sum total of the bandwidths of the ports 210-1 ... 210-n by a given margin, some inefficiencies are also accounted for as data flows through the switch system 200.

An example for determining peak bandwidth values for the memory pool 225 is as follows. If 32×100 Mbit ports are used in the switch system 200 (e.g., each switch node 205 includes 8×100 Mbit ports 210-1 to 210-8), then the sum total of the bandwidths is equal to about 6.4 Gbits/s (6.4 Gbits/s=32×100 Mbits/s×2, wherein the factor of 2 accounts for full-duplex traffic). Based on the 6.4 Gbits/s port bandwidths sum total, a memory pool 225 with a peak bandwidth of, for example, about 15 Gbits/s should be implemented to provide an adequate margin against inefficiencies.

As is known, Ethernet packets are carried in frames of between 64 and 1518 bytes. MAC layer components (not shown) are used to convert the frames, serially transmitted through ports 210, into packets 250 having a predetermined size of, for example, 64-bytes. Thus, a 128-byte Ethernet frame is received by the corresponding Port ASIC in switch stage 215 in two (2) 64-byte packets 250. Further control signals are provided by the MAC layer components to signal the start and end of a frame. It should be noted, however, that the present invention is not limited to the above-described Ethernet example; rather the present invention is adaptable for use in other packet switching technologies as well. Moreover, packet sizes other than 64 bytes may be implemented.

Figure 5:
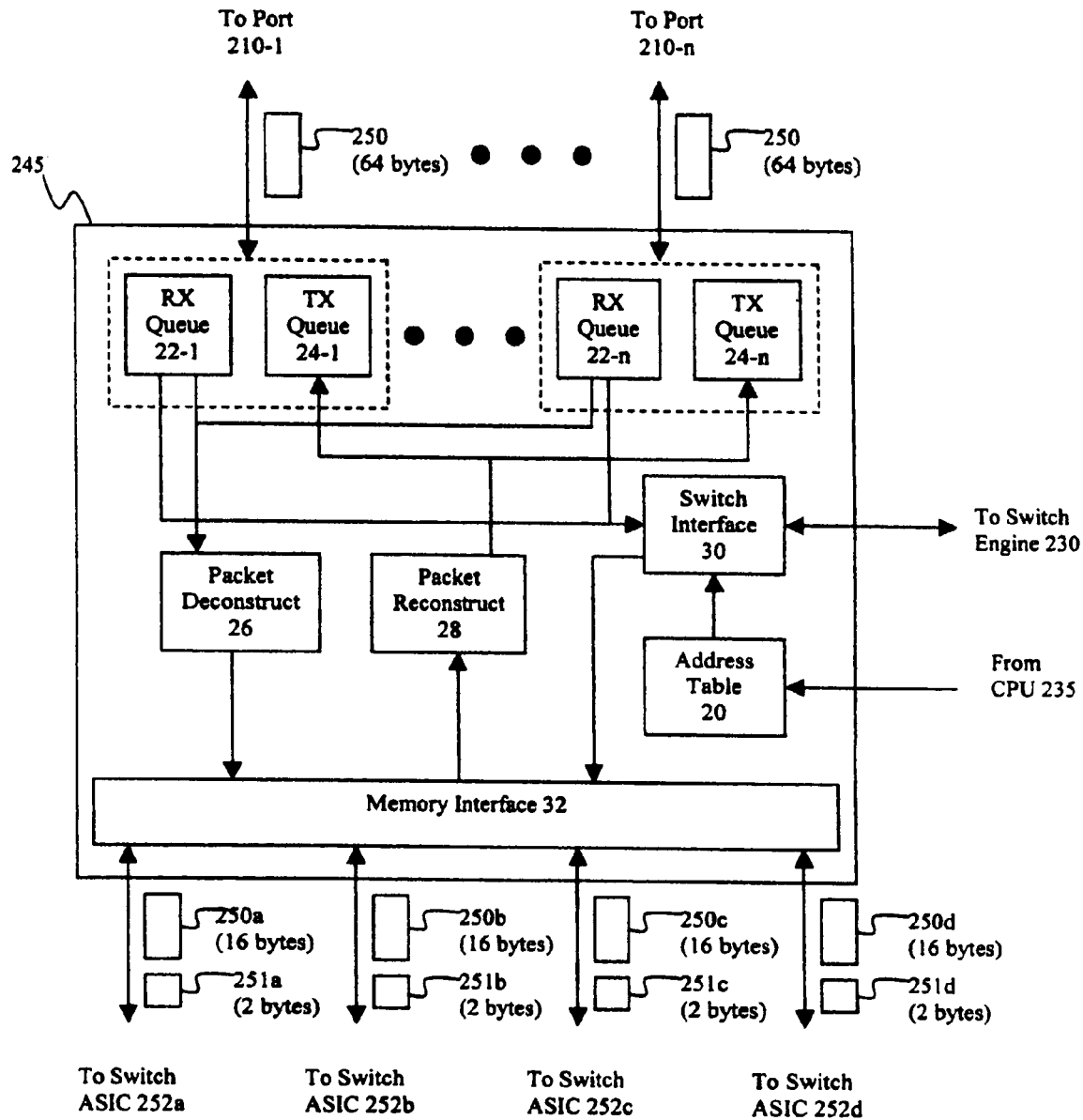
FIG. 5 further illustrates an example of a Port ASIC that can be included in the memory switch system according to the invention illustrated in FIG. 3.

In FIG. 5 there is shown a Port ASIC 245 which can be an implementation of Port ASICs 245a, 245b, 245c, and/or 245d according to a preferred embodiment of the invention. It includes receive (RX) and transmit (TX) queues 22 and 24 associated with each port 210-1 ... 210-n with which Port ASIC 245 interfaces. Packet deconstruct module 26 and packet reconstruct module 28 are responsible for splitting up and reconstructing, respectively, packets that are transmitted between ports 210 and memory switch 220. Switch interface 30 communicates with switch engine 230 and address table 20 stores addresses corresponding to regions in memory pool 225 associated with each respective port 210. CPU 235 initializes the settings in address table 20. CPU 235 can divide the total memory capacity evenly between all the ports in the system, or it can assign larger spaces, for example, for higher speed ports and smaller spaces, for example, for lower speed ports. CPU 235 or other instrumentalities can also dynamically update the settings in accordance with, for example, loads on certain ports.

Figure 6:
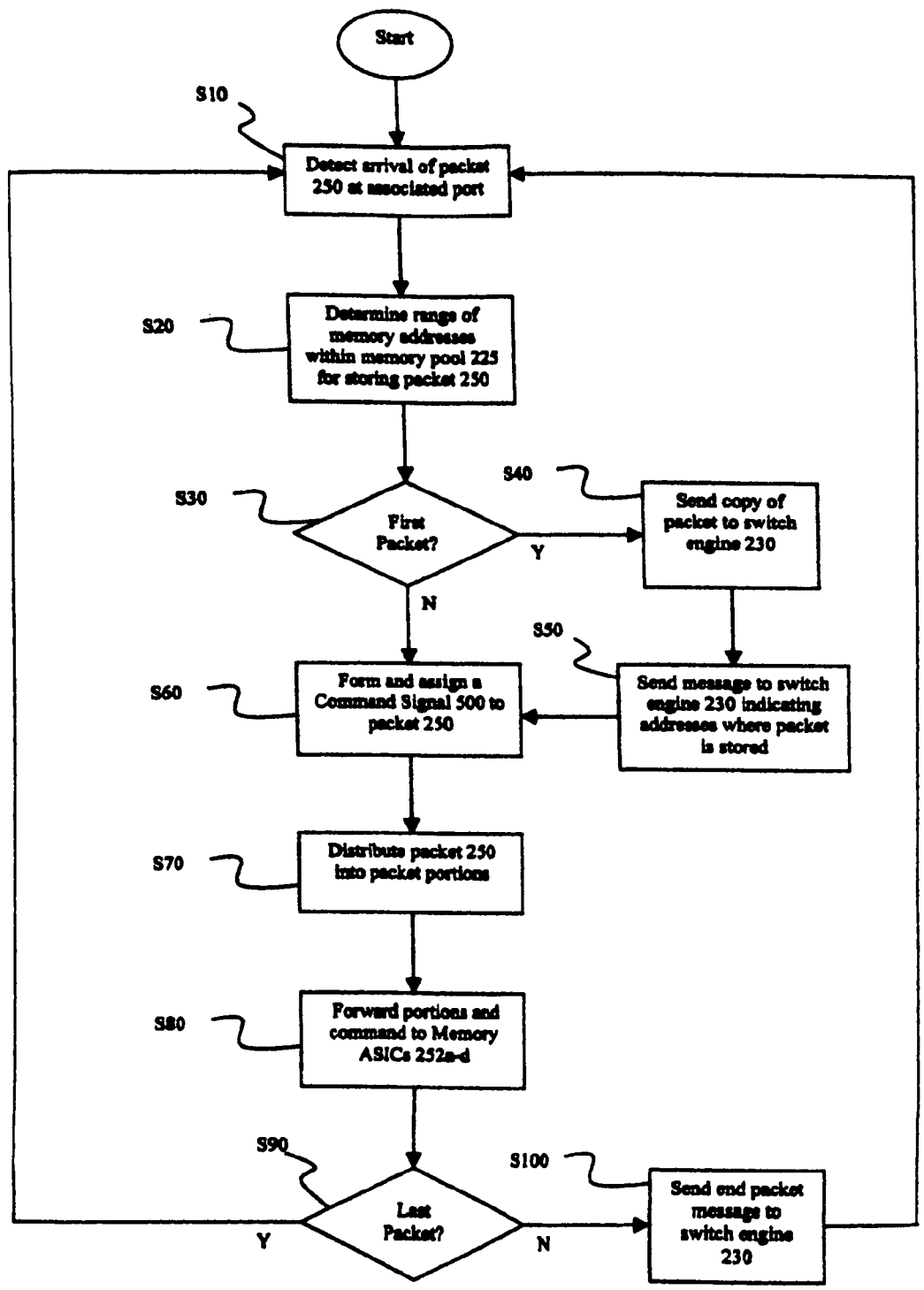
FIG. 6 is a flowchart illustrating the method implemented by a Port ASIC such as that illustrated in FIG. 5 as a packet is received from a source port and buffered in the memory pool of FIG. 3.

In operation, a 64-byte packet 250 received at one of ports 210 by Port ASIC 245 is distributed (or divided) into four 16-byte packet portions (or other size portion, depending on the size of the packet 250 and the number of Memory ASICs) 250a, 250b, 250c, and 250d and stored in memory pool 225 via memory switch 220, as will be explained now in more detail with reference to FIG. 6. Switch interface 30 detects the arrival of a given packet 250 in one of the RX queues 22-1 ... 22-n associated with ports 210-1 ... 210-n (step S10). Switch interface 30 determines, from address table 20, the range of memory addresses within memory pool 225 for storing the given packet 250 based on which of the ports 210-1 ... 210-n the given packet 250 arrived (step S20). Switch interface 30 immediately forwards a copy of the packet 250 (assuming it is the first packet in the frame, as determined in step S30, for example by determining whether it is the first packet received after a start of frame signal) to switch engine 230 (step S40). Alternatively, the switch engine 230 can independently receive a copy of the first packet in the frame by other instrumentalities. The first 64 bytes of an Ethernet frame will include the frame header information that the switch engine 230 will use to determine how to forward the frame. Switch interface 30 also forwards a message to switch engine 230 that includes the memory pool 225 addresses at which the given packet 250 will be stored (step S50). Switch engine 230 will store this address in Table RAM 240, along with an identifier for the frame and then begin its packet forwarding determination operations.

Switch interface 30 forms a command 251 for relaying along with the split packet portions and sends it to memory interface 32 (step S60). The command includes the address at which the portion is to be stored in memory, as well as an indicator indicating that a memory write operation is to be performed. Packet deconstructor 26 splits the given packet 250 into the packet portions 250a-250d (step S70). When memory interface 32 receives the packet portions and command, it transfers the packet portions and appended command to the appropriate Memory ASICs 252a-252d so that the packet portions are stored in the proper memory pool 225 addresses (step S80). For example, a 64-byte packet 250 is formed by Byte[0] ... Byte[63]. Packet deconstructor 26 splits the packet, and memory interface 32 sends the portions, so that Memory ASIC 252a receives the packet portion 250a, i.e., Byte[0] ... Byte[15], while Memory ASIC 252b receives the packet portion 250b, i.e., Byte[16] ... Byte[31], Memory ASIC 252c receives the packet portion 252c, i.e., Byte[32] ... Byte[47], and Memory ASIC 252d receives the packet portion 252d, i.e., Byte[48] ... Byte[63]. By distributing the 64-byte packet 250 into four equal sized packet portions 250a-250d, it is ensured that the bandwidth load is always equally distributed across the four memory devices 227a-227d (see FIG. 3) of the memory pool 225 (see FIG. 3) and that overloading does not occur in any of the individual Memory ASICs 252a-252d. Although an equal loading among memory devices is preferred, it is not necessary and other implementations are possible.

It should be noted that frames may have an arbitrary size that result in data not fully consuming a 64-byte packet. For example, an 80-byte frame will consume one 64-byte packet and 16 bytes of a subsequent packet. Processing can be further performed to ensure that these odd portions are equally loaded among memory devices. For example, if an 80-byte frame is received from port 1, the Port ASIC will cause the leftover 16-byte portion to be stored in memory device 227a via Memory ASIC 252a. On the other hand, if the 80-byte frame is received from port 2, the Port ASIC will cause the leftover 16-byte portion to be stored in memory device 227b via Memory ASIC 252b. It should be apparent that other load balancing techniques are possible, such as, for example, by making a determination based on addresses.

A circular buffer structure is maintained for each port, and the packets are preferably placed "back-to-back". For example, if a packet received at a given port is stored at addresses 0 ... N in the memory pool 225, switch interface 30 will keep track so that the initial portion of a next received packet for the given port is stored at address N+1. This will continue until the entire address range for the port has been filled, in which case switch interface 30 will reset the starting address for stored packets to the beginning of the address range for the port.

If the packet that was stored was not the last packet in the frame (as determined in step S90, e.g. no signal has been received signaling the end of the frame), control will return to step S10 and the Port ASIC will continue to receive and store packets for the frame in memory pool 225. When the last packet is received, switch interface 30 will notify switch engine 230 to that effect (S100) and the packet will await further frames.

Figure 7:
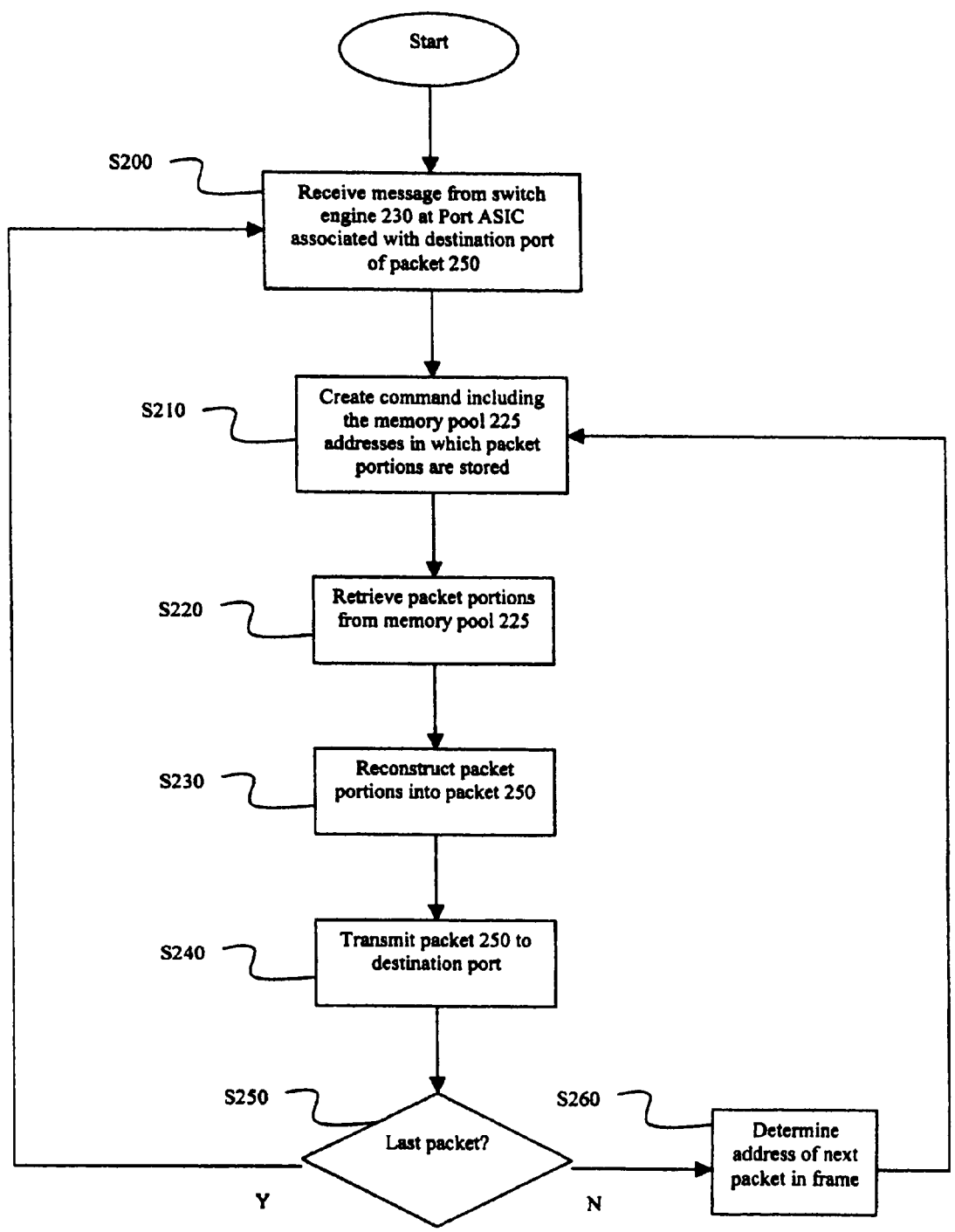
FIG. 7 is a flowchart illustrating the method implemented by a Port ASIC such as that illustrated in FIG. 5 as a packet is retrieved from the memory pool of FIG. 3 and is then transmitted to a destination port.

In operation, a 64-byte packet 250 transmitted via one of ports 210 by Port ASIC 245 is reconstructed from four 16-byte packet portions (chunks) 250a, 250b, 250c, and 250d that were retrieved from memory pool 225 via memory switch 220, as will be explained now in more detail with reference to FIG. 7. When switch engine 230 determines how a frame must be forwarded, it looks up the address for the packet in Table RAM 245 and sends a message to switch interface 30 of the Port ASIC 245 associated with the destination port of the frame. The message includes, for example, the address in memory where the frame is stored, the size of the frame, and the destination port number. Switch interface 30 of the associated Port ASIC 245 receives the message (S200) and creates a command 251 to be sent to the memory switch (S210). The command includes the address in memory where the packet is stored, as well as an indication that a memory read operation is to be performed.

The packet portions 250a-250d are received by memory interface 32 in response to the command (step S220). Memory interface 32 sends them to packet reconstructor 28 which reconstructs the received packet portions 250a-250d into the given packet 250 (step S230). When the entire 64 bytes have been received, packet reconstructor 28 relays the packet 250 to the TX queue 24 associated with the packet's destination port (of ports 210-1 ... 210-n) (step S240). If this is not the last packet in the frame (determined in step S250), switch interface 30 determines the memory pool address of the next packet in the frame (step S260), and control returns to step S210 for retrieving the next packet from memory pool 225. Otherwise, control returns to step S200 for waiting for the next message from switch engine 230.

Figure 8:
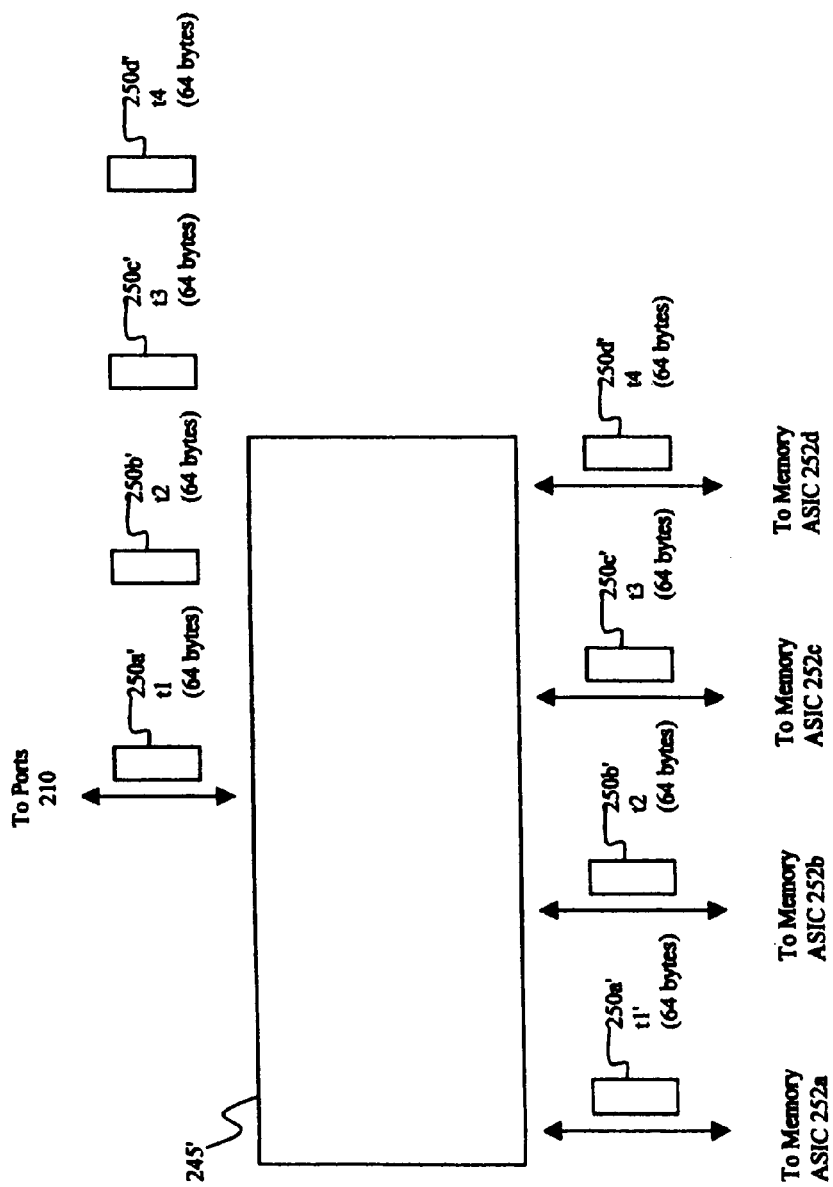
FIG. 8 illustrates another example of a Port ASIC that can be included in the memory switch system according to the invention illustrated in FIG. 3.

FIG. 8 shows an alternative embodiment of the Port ASIC, generally shown as 245', according to the invention. The packets 250a40, 250b', 250c', and 250d' are received at time t1, t2, t3, and t4, respectively. Each of the packets is sized at, for example, 64 bytes. The Port ASIC then outputs the packets 250a', 250b', 250c'and 250d' at time t1', t2', t3' and t4', respectively, which are also 64 bytes, not 16 bytes as in the previous example. Accordingly, load-balancing of stored packets between areas of the memory pool 225 is achieved but in a different manner than described above.

Figure 9:
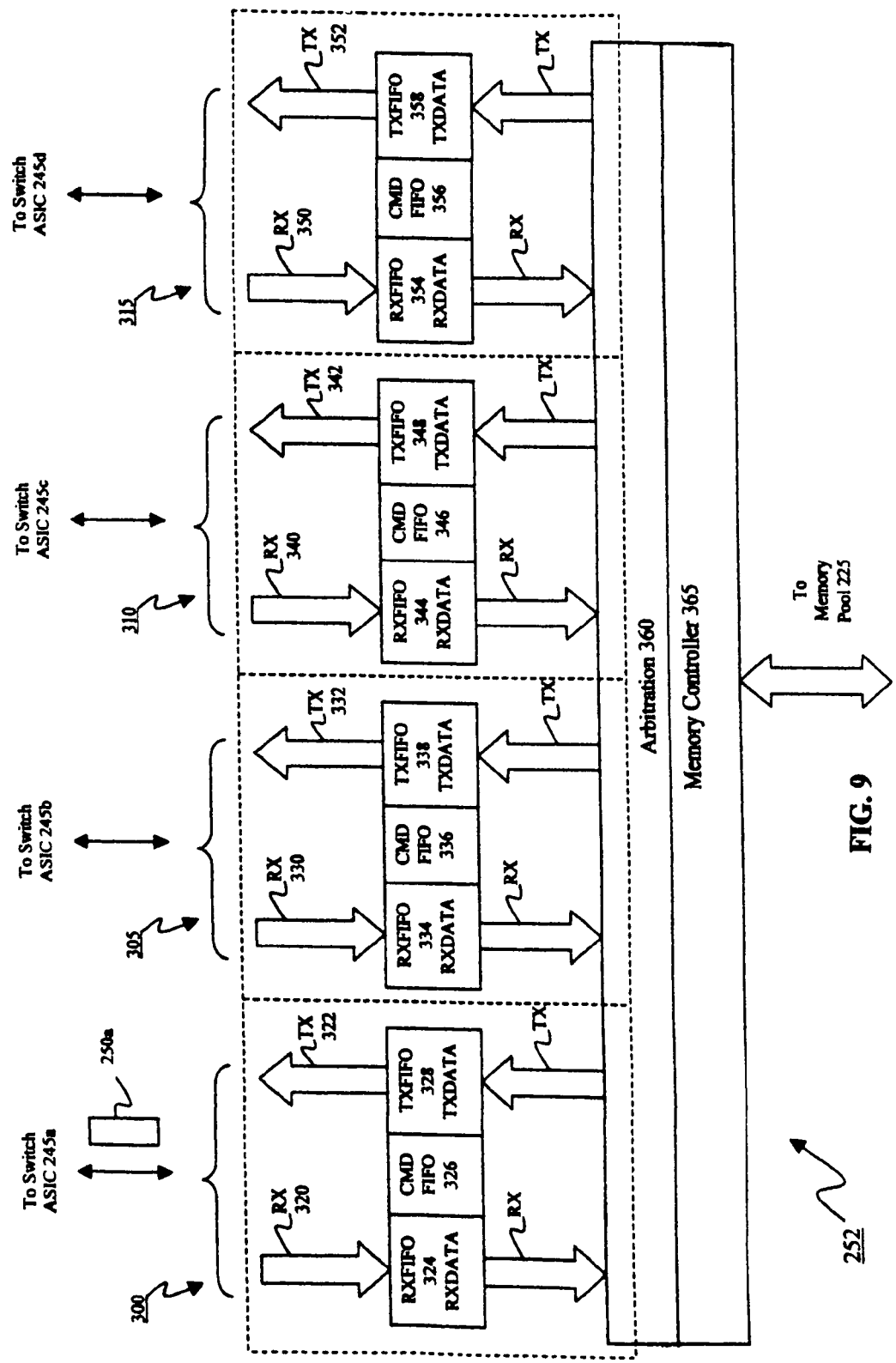
FIG. 9 further illustrates an example of a Memory ASIC that can be included in the memory switch system according to the invention illustrated in FIG. 3.

FIG. 9 shows a Memory ASIC 252 which can. be an implementation of the Memory ASICs 252a, 252b, 252c, and/or 252d (FIG. 3), and which receives the 16 byte packet portions 250a-250d according to a preferred embodiment of the invention. A plurality of full duplex channels 300, 305, 310, and 315 couples the Memory ASIC 252 to the multiple ports via switch stage 215. Each of the channels 300-315 enables the bi-directional transmission of a 16-byte packet portion (e.g., packet portion 250a), or 64-byte packet portion in the example of FIG. 8, or other size portion depending on implementation.

In the example of FIG. 9, the Memory ASIC 252 is shown as having only four (4) channels. However, an N number of channels can be implemented for the Memory ASIC 252, with the number of channels being limited by die size, pin count, and other constraints based on whether the ASIC is to be implemented on a single integrated circuit chip or multiple integrated circuit chips.

The channel 300 includes the receive (RX) path 320, the transmit (TX) path 322, the RXDATA FIFO 324, the Command FIFO 326, and the TXDATA FIFO 328, with the operation of these elements being elaborated upon more fully hereinafter. Similarly, the channel 305 includes the RX path 330, the TX path 332, the RXDATA FIFO 334, the Command FIFO 336, and the TXDATA FIFO 338. The channel 310 includes the RX path 340, the TX path 342, the RXDATA FIFO 344, the Command FIFO 346, and the TXDATA FIFO 348, while the channel 315 includes the RX path 350, the TX path 352, the RXDATA FIFO 354, the Command FIFO 356, and the TXDATA FIFO 358.

The RX paths (e.g., RX path 320) are used for transmitting the packet portions (e.g., packet portion 250a) from switch stage 215 to the memory pool 225. The TX paths (e.g., TX path 322) are used for transmitting the packets portions from the memory pool 225 to the switch stage 215. The Memory ASIC 252 further includes the arbitration hardware 360 and the Memory Controller 365. The arbitration hardware 360 is implemented based on, for example, a standard round robin scheme which gives fair access to each of the channels 300-315. The memory controller 365 can be implemented by a standard memory data controller, and the implementation is dependent upon the type of memory technology (e.g., SDRAMs, Rambus DRAMs, Dual Data Rate DRAMs, etc.) used in memory pool 225.

In operation, assume that command 251a and/or packet portion 250a are to be communicated with Memory ASIC 252. The Command FIFOs 326, 336, 346 and/or 356 process the receive commands and transfer commands as indicated by the given command 251a (e.g. write=receive, read=transfer). The received command 251a is stored in the Command FIFO upon receipt. The receive commands serve to permit the data packet portions 250a-250d to be written into the memory pool 225, while the transfer commands serve to permit the data packet portions 250a-250d to be read from the memory pool 225. The RXDATA FIFOs (e.g., FIFO 324) buffer the RXDATA (which is, e.g., a received data packet portion 250a to be written into the memory pool 225), while the TXDATA FIFOs (e.g., FIFO 328) buffer the TXDATA (which is, e.g., a data packet portion 250a which has been read from the memory pool 225).

The channel 300 (or any of the other channels) is "ready" to transfer data to or from the memory pool 225 once a "full command" 251 and its associated data 250, if any, are presented in the Command FIFO 326. The arbitration hardware 365 arbitrates between all channels which are ready to transfer data and determines which of the ready channels will access and transfer data to and from the memory pool 220 at a given time. As stated above, a standard round-robin arbitration scheme, for example, is used, to implement the arbitration hardware 360. The channel which is permitted to access the memory pool 225 will read from or write to the memory pool 225. For a receive command, the packet portion 250a (and the packet portions 250b-250d) is written from RXFIFO 324 and buffered in memory pool 225 addresses indicated by the receive command. For a transfer command, the packet portion 250a (and the packet portions 250b-250d) is read from memory pool 225 addresses indicated by the transfer command and stored in TXFIFO 328. The packet portion 250a is then output to the Port ASIC 245 corresponding to the channel.

Figure 1:
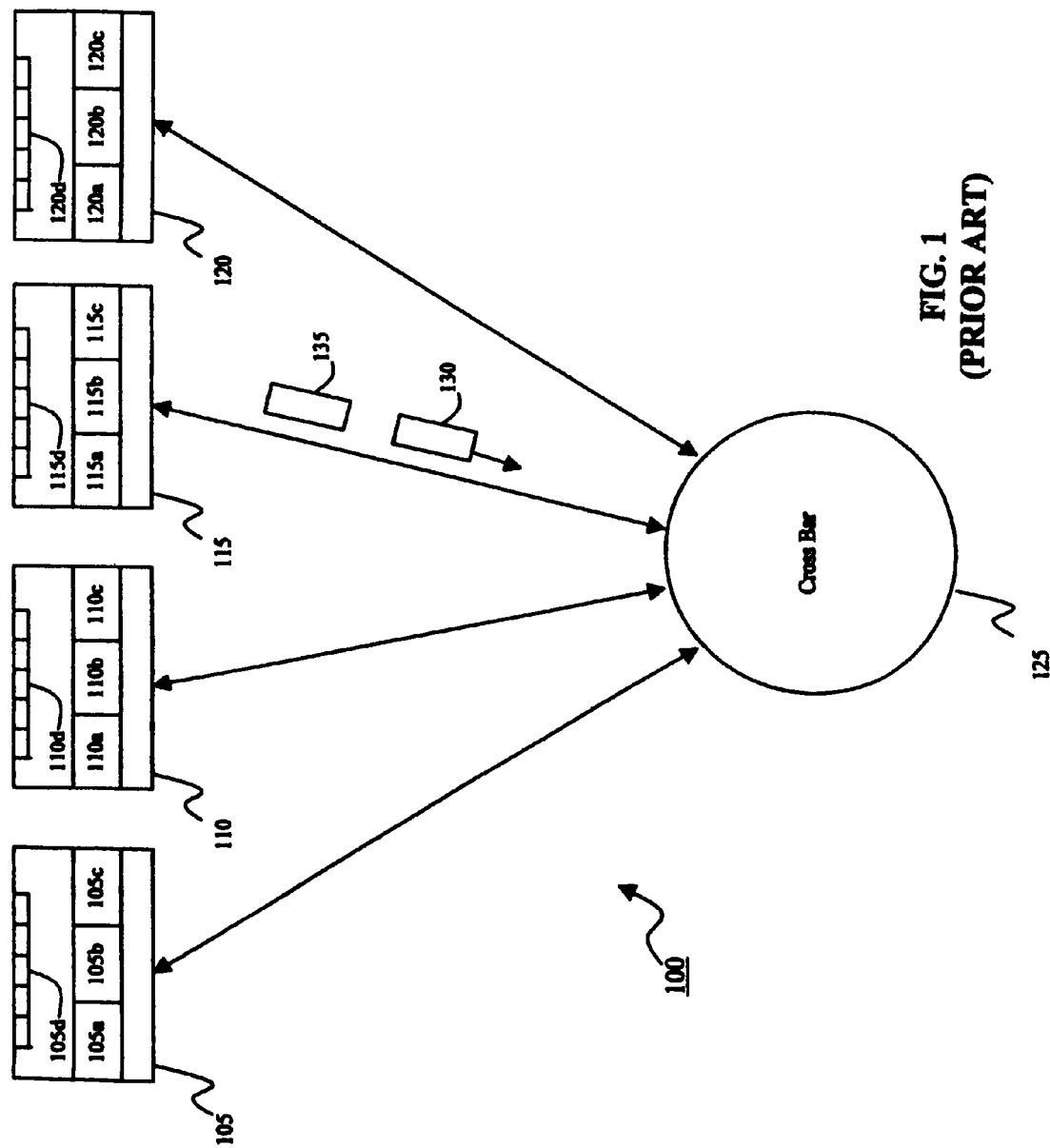
FIG. 1 illustrates a switch system based on the cross-bar architecture.
Figure 2:
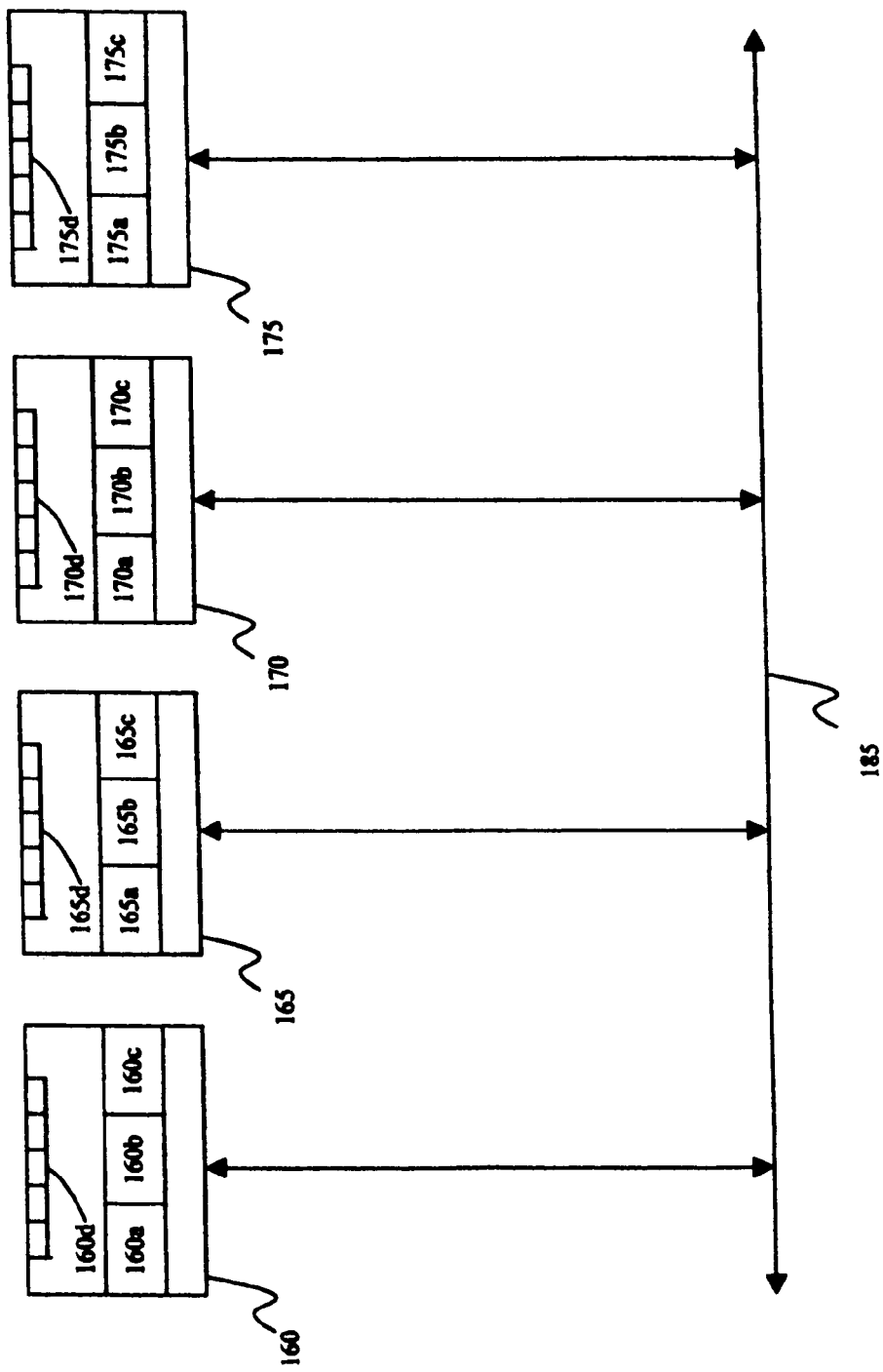
FIG. 2 illustrates a switch system based on the shared-bus architecture.

As mentioned above, memory pool 225 can be implemented in a number of ways. The use of DRAM devices to implement the memory pool 225 leads to the following possible advantages. First, the DRAM devices in the memory pool 225 as described above leads to lower system cost, but also allows higher bandwidth capability than in conventional systems which do not use the memory pool configuration. In contrast, prior art switch systems require a local SRAM to be implemented in each switch node, as shown in FIGS. 1 and 2. Additionally, since SRAM devices are more expensive than DRAM devices, the use of SRAM devices can increase system cost by as much as about three to four times as compared to the present invention.

Another advantage made possible by the invention is the higher memory capacities provided by the DRAM devices which implement the memory pool 225. Higher memory capacities lead to a higher switching capability for the memory switch in accordance with the present invention. Further, the invention can easily incorporate advances in DRAM technology (e.g., higher speed, higher bandwidth or higher capacity). By changing the number of DRAM ports in the Memory ASICs 252a-252d and/or by changing the type of memory technology which is implemented in the memory pool 225, the switching capacity of the present invention can be increased. Examples of memory pool 225 peak bandwidth values are shown below for specific memory implementations:

EXAMPLE 1

A peak bandwidth of 3.84 Gbits/s is achieved by configuring one 64-bit SDRAM port at 60 MHz per Memory ASIC 252a, 252b, 252c or 252d.

EXAMPLE 2

A peak bandwidth of 16 Gbits/s is achieved by configuring two 64-bit SDRAM ports at 125 MHz per Memory ASIC.

EXAMPLE 3

A peak bandwidth of 19.2 Gbits/s is achieved by configuring four Rambus DRAM ports at 600 MHz per Memory ASIC.

As memory technology advances, the advances can be incorporated in the memory switch system of the invention by appropriately configuring the Memory ASICs 252a-252d and the memory pool 225 as discussed above. Other parts of the switch system 200 need not be affected. Additionally, as alluded to above, the ports 210-1 . . . 210-n can share the use of the memory pool 225, and the memory pool 225 is available to be shared unequally by all ports 210-1 . . . 210-n. Thus, each port 210-1 . . . 210-n is not subject to a "fixed-size" limitation. In contrast, under the more restrictive "fixed-size" design, ports of a given node can only share memory addresses which are available for that given node.

Moreover, it is possible to utilize the memory banks of DRAM devices so that, for example, a packet chunk is being received or stored in one memory bank of a given DRAM device, while another packet chunk is being retrieved from the another memory bank of the same given DRAM device or from another DRAM device in the memory pool 225. This full duplex operation capability thereby permits the system to achieve a higher bandwidth capability. In other words, the operation on different banks can overlap. While a given packet chunk is being read from one memory bank, other memory banks can be setting up new pages for the next packet chunk transfer. In contrast, if packet traffic is concentrated in only one memory bank, the bandwidth of a particular system will be more limited.

Figure 10A:
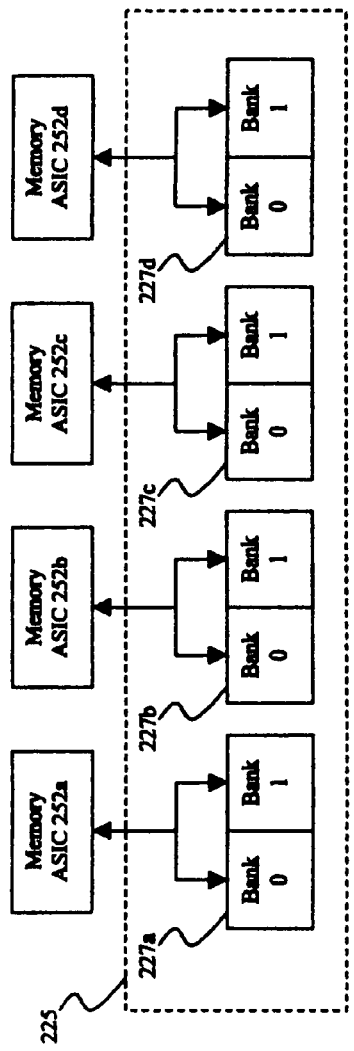
FIGS. 10A and 10B further illustrate examples of a memory pool that can be included in the memory switch system according to the invention illustrated in FIG. 3.
Figure 10B:
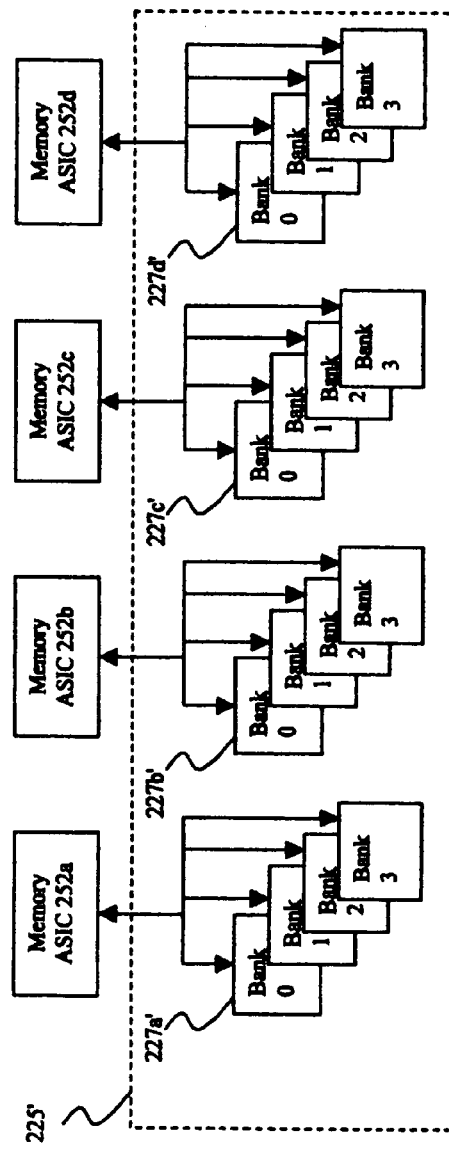

Commercially available memory devices are oriented towards PC applications whereby sequential data is transferred for long burst, e.g. 64 bytes or 128 bytes per transfer. Therefore, the page mode of DRAMs can be used efficiently when implementing the commercially available memory devices for PC applications. In the present invention, however, in which each 16-byte chunk is transferred to or from a different page, page mode is not as advantageous and the following modifications are essential. First, for a 64-bit wide DRAM implementation, a burst-size of "2" is used (i.e., in two (2) cycles, 16-bytes will be transferred to the DRAM). Second, the use of memory banks is maximized. Thus, data is spread across all available banks in the high bandwidth memory pool 225. By spreading data across available banks, the overlapping of memory operations are allowed, thereby permitting a greater bandwidth to be achieved. A commercially available memory typically has about two (2) memory banks, while Dual Data Rate DRAMs can have up to about eight (8) memory banks. Third, additional pins are added to each of the DRAMs for use in DRAM signaling functions (such as "COMMAND" signals to the DRAMs. This permits a greater overlap to occur between COMMAND signals and DATA signals. FIG. 10A illustrates an example of memory pool 225 wherein each Memory ASIC interfaces with a memory device 227 having two. memory banks. FIG. 10B illustrates an example of memory pool 225' wherein each Memory ASIC interfaces with a memory device 227' having four memory banks, which yields further overlapping of memory functions, and thus, greater bandwidth over the implementation in FIG. 10A.

Figure 11:
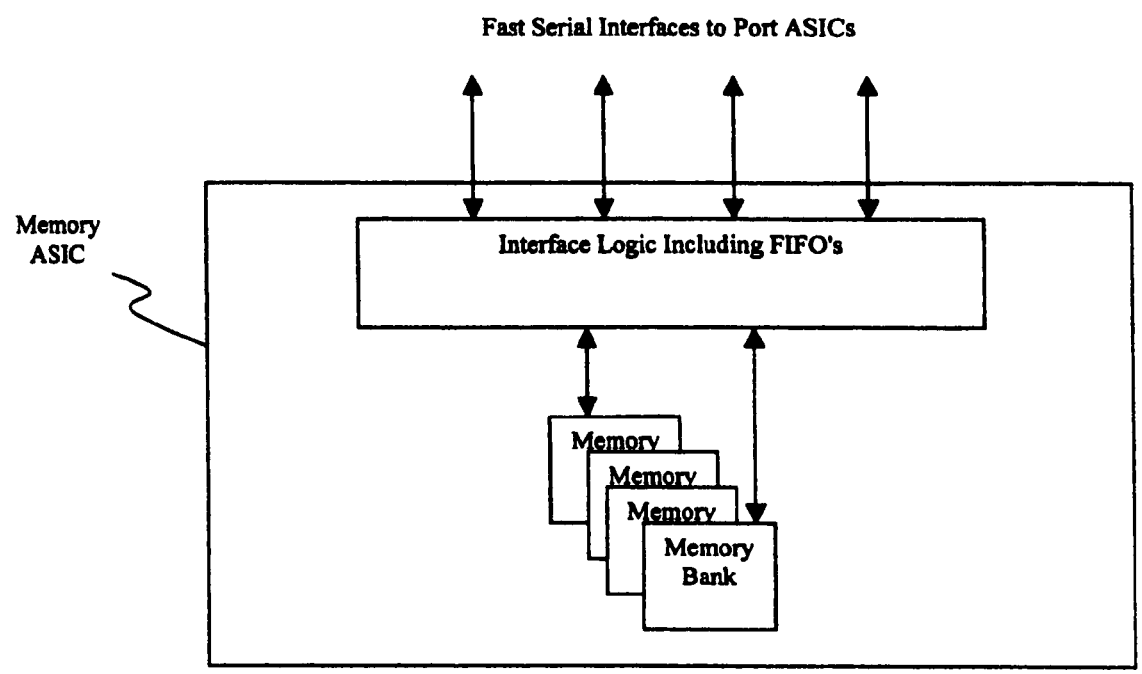
FIG. 11 illustrates an alternative implementation of a Memory ASIC and a memory pool consistent with the principles of the present invention.

It should be understood that other implementations of Memory ASICs 252 and memory pool 225 are possible while remaining within the principles of the present invention. For example, as shown in FIG. 11, the interface logic and FIFO functionality of the Memory ASIC 252 shown in FIG. 8, as well as the memory (e.g. four to sixteen banks) of memory pool 225 can be implemented together in a single semiconductor device such as an ASIC.

Further advantages are obtained by utilizing Rambus memories to implement the memory pool. Some of the advantages of using Rambus DRAMs to implement the DRAM devices in the memory pool 225 are as follows. A Rambus DRAM (concurrrent type) typically operates at about 600 MHz with 8 bits for data and a 31-pin interface. The peak per-pin-bandwidth is therefore (600 MHz*8 bits/31 pins) or 154 Mbits/s. In contrast, the bandwidth of conventional SDRAMs is limited by the SDRAM pin interface. The fastest commercially available SDRAM operates at about 143 MHz. For a 64-bit implementation, about 80 pins are required. Thus, the peak per-pin bandwidth of an SDRAM is therefore (125 MHz*64 bits/80 pins) or 100 Mbits/s. It should be noted that SDRAMs provide parallel synchronous busses for data transfers. Due to pinout constraints and cost constraints, the largest bus that exist on a single SDRAM chip is 32-bits in size. Multiple buses can be cascaded to form wider interfaces. However, since the ASIC pinout costs increases significantly with wider interfaces, practical limits today are buses of 64-bits, as factored in the above calculation.

Currently available Rambus DRAMs provide a peak bandwidth of 4.8 Gbits/s and consume 31 pins. Thus currently available Rambus DRAMs average about 154 Mbits per pin, (154 Mbits per pin=4.8 Gbits/s divided by 31 pins). About 4 Rambus DRAMs can interface with an ASIC. For example, in FIG. 10B, each ASIC can interface with 4 Rambus DRAMs rather than a single device having four banks. As stated above, each Rambus DRAM provides a peak bandwidth of 4.8 Gbits/s. Therefore, each ASIC 252a-252d will have peak bandwidth of about 19.2 Gbits/s or (4.8 Gbits/s*4). Effective bandwidth in network applications ranges from about 60% to about 75% of the peak bandwidth. Thus, the effective bandwidth of each ASIC 252a-252d will be about 12 Gbits/s or (19.2 Gbits/s*60%). Thus, for a 96 Gbits/s system, about 8 ASICs are required to be implemented (96 Gbits/s=12 Gbits/s * 8 ASICs).

Figure 12:
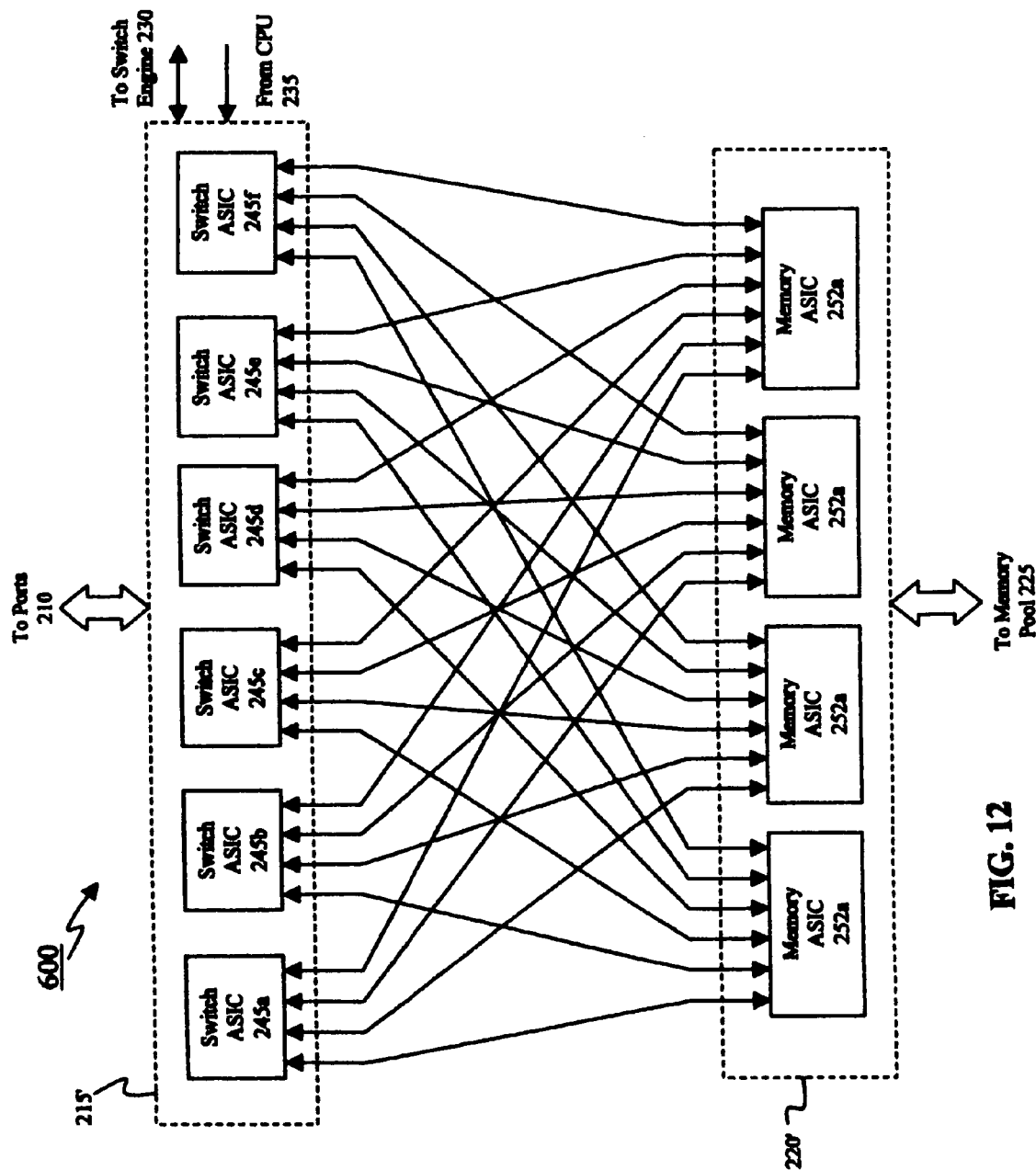
FIG. 12 is a memory switch system according to another embodiment of the present invention.

FIG. 12 shows another embodiment of the memory switch system, generally shown as 600, according to the invention wherein a 6×4 interconnection stage couples the switch nodes 205 to the memory pool 225. A Switch ASIC stage 215' comprises six Switch ASICs 245a-245f and is coupled between the switch nodes 205 and the Memory Switch 220. This embodiment enables the above mentioned advantages and further achieves a higher bandwidth and switching capacity since the switch system 600 permits more nodes 210-1 . . . 210-n to be added. It should be apparent that other implementations are possible, such as 8×4, 4×6, 4×8 and other variations.

It should be noted that the memory switch system 200 and/or 600 can be implemented by use of VLSI devices to connect the ports 210-1 . . . 210-n together and to the memory pool 225. The interconnects are chip-to-chip based interconnections wherein chip-to-chip refers to a direct connection between two given ASICs (as opposed to having, for example, a buffer between the ASICs). The chip-to-chip based interconnections enable higher integration and lower implementation costs as compared to conventional approaches. In addition, since the switching logic of the invention is highly integrated in the ASICs, the invention can be implemented with smaller PCBs which lead to small form factor systems.

It should be further noted that the high system level architecture and the Switch ASICs and Memory ASICs implementations according to the invention also permit wire speed switching for packet sizes between specified bandwidth ranges, e.g., about 64 bytes to about 1518 bytes. In contrast, conventional switch systems have to operate at predetermined "sweet spots" (e.g., 64 bytes etc.) in order for the conventional switch system to function correctly. In addition, a conventional switch system is pre-designed to function at a predetermined sweet spot, and is unable to perform wire speed switching outside those sweet spots.

While the invention has been described in connection with what is presently considered to be the preferred embodiments, it is understood that the invention is not limited to the disclosed embodiments. For example, each of the features described above can be used singly or in combination, as set forth below in the claims, without other features described above which are patentably significant by themselves. Accordingly, the present invention is intended to cover various modifications and equivalent arrangements included within the spirit and scope of the appended claims.

What is claimed is:

1. A distributed memory switch system, comprising:
   a plurality of ports including a source port and a destination port;
   a memory pool;
   an interconnection stage to couple between the plurality of ports and the memory pool such that the interconnection stage permits a packet to be sent from the source port to the destination port via the memory pool, the interconnection stage to split the packet received from the source port into multiple packet portions for storage in the memory pool, wherein the interconnection stage includes a switch stage to couple to the plurality of ports, and a memory switch to couple to the switch stage and to the memory pool; and
   a processor to couple to the interconnection stage, the processor to assign memory space from the memory pool to the ports, and wherein the processor assigns a larger amount of memory space from the memory pool to higher speed ports and a smaller amount of memory space from the memory pool to lower speed ports.

2. The distributed memory switch system of claim 1 wherein the processor assigns varying amounts of memory space from the memory pool to different ports.

3. The distributed memory switch system of claim 1 wherein the processor assigns a same amount of memory space from the memory pool to multiple ports.

4. The distributed memory switch system of claim 1 wherein the processor assigns memory space from the memory pool to the ports based upon a number of packets communicated by each port.

5. The distributed memory switch system of claim 1 wherein the interconnection stage splits the packet received from the source port into multiple equal-sized packet portions for storage in the memory pool.

6. The distributed memory switch system of claim 1 wherein the interconnection stage splits the packet received from the source port into at least one odd-sized packet portion for storage in the memory pool.

7. The distributed memory switch system of claim 1 wherein the interconnection stage splits a first portion of the packet received from the source port into multiple equal-sized packet portions for storage in the memory pool, and a second portion of the packet received from the source port into at least one odd-sized packet portion for storage in the memory pool.

8. A switch system for switching packets between ports, comprising:
   an interconnection stage arranged to transmit the packets between the ports;
   a memory pool to connect to the interconnection stage to store the packets which are received from the ports, wherein the interconnection stage splits certain of the packets received from the ports into multiple packet portions for storage in the memory pool, and the interconnection stage includes a switch stage to connect to the ports and a memory switch to connect to the switch stage and the memory pool; and
   a processor to connect to the interconnection stage, the processor to assign memory space from the memory pool to the ports, and wherein the processor assigns a larger amount of memory space from the memory pool to higher speed ports and a smaller amount of memory space from the memory pool to lower speed ports.

9. The switch system of claim 8 wherein the processor assigns varying amounts of memory space from the memory pool to different ports.

10. The switch system of claim 8 wherein the processor assigns a same amount of memory space from the memory pool to multiple ports.

11. The switch system of claim 8 wherein the processor assigns memory space from the memory pool to the ports based upon a number of packets communicated by each port.

12. The switch system of claim 8 wherein the interconnection stage splits the packet received from the source port into multiple equal-sized packet portions for storage in the memory pool.

13. The switch system of claim 8 wherein the interconnection stage splits the packet received from the source port into at least one odd-sized packet portion for storage in the memory pool.

14. The switch system of claim 8 wherein the interconnection stage splits a first portion of the packet received from the source port into multiple equal-sized packet portions for storage in the memory pool, and a second portion of the packet received from the source port into at least one odd-sized packet portion for storage in the memory pool.

* * * * *

UNITED STATES PATENT AND TRADEMARK OFFICE
CERTIFICATE OF CORRECTION

PATENT NO. : 7,535,898 B2
APPLICATION NO. : 11/315565
DATED : May 19, 2009
INVENTOR(S) : Visveswar Akella et al.

It is certified that error appears in the above-identified patent and that said Letters Patent is hereby corrected as shown below:

On the title page, item (74), under "Attorney, Agent, or Firm", in column 2, line 1, delete "Kacvinski LLC" and insert -- Kacvinsky LLC --, therefor.

Signed and Sealed this

Sixteenth Day of March, 2010

David J. Kappos
*Director of the United States Patent and Trademark Office*